United States Patent Office 3,814,772
Patented June 4, 1974

3,814,772
ORTHO-AMINO BENZOYL HYDRAZINE DERIVATIVES AND PROCESS FOR PREPARING THE SAME
Jean B. Philippe, Clermont-Ferrand, France, assignor to Ferlux, pres Clermont-Ferrand, France
No Drawing. Filed Sept. 7, 1971, Ser. No. 178,383
Claims priority, application France, Sept. 8, 1970, 7032533
Int. Cl. C07d 29/30
U.S. Cl. 260—293.77                                   7 Claims

ABSTRACT OF THE DISCLOSURE

New ortho-amino benzoyl hydrazine derivatives of the general formula I:

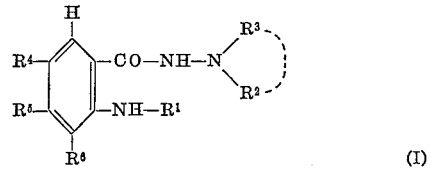

wherein $R^1$, $R^2$, $R^3$, $R^4$, $R^5$ and $R^6$ are selected organic groups, and pharmaceutical preparations containing same as active ingredients, having analgesic, anti-inflammatory and antipyretic action.

A method of manufacturing the hydrazine derivatives of formula I comprises reacting a primary amine with ortho-halogenobenzoic acid at reflux in an organic solvent in the presence of potassium carbonate and cupric acetate, collecting the ortho-amino benzoic acid derivative thus formed, reacting said benzoic acid derivative with phosgene in a basic environment to form an isatoic anhydride derivative which is collected and reacted with hydrazine or a substituted hydrazine.

---

This application is based on my prior French application No. 703253, filed in France on Sept. 8, 1970, and the priority date of my prior French application is claimed for the present application in accord with 35 U.S.C. 119.

This invention relates to new derivatives of ortho-amino benzoyl hydrazine derivatives, a method of manufacturing same and pharmaceutical preparations containing same.

According to the present invention there are provided new ortho-amino benzoyl hydrazine derivatives of the general formula I:

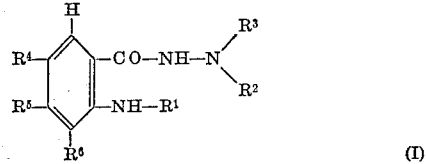

wherein $R^1$ is selected from (a) substituted phenyl groups

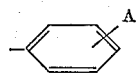

wherein A is selected from halogen atoms and trihalogenoalkyl, alkyl and alkoxy groups, (b) heterocyclic groups, such as a furyl group (c) alkyl groups having 3 or more carbon atoms, (d) alkylaryl groups

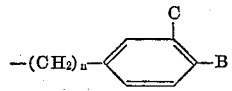

wherein $n$ is 1, 2 or 3 and B and C are selected from hydrogen atoms and methoxy groups, (e) a naphthyl group, (f) arylalkyl group and (g) substituted benzoyl groups, such as, for example,

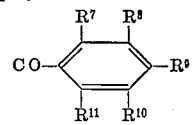

wherein $R^7$, $R^8$, $R^9$, $R^{10}$ and $R^{11}$ are selected as follows:
(i) $R^7$, $R^9$, $R^{10}$ and $R^{11}$ are hydrogen atoms and $R^8$ is selected from a fluorine atom and a trifluoromethyl group;
(ii) $R^8$, $R^9$, $R^{10}$ and $R^{11}$ are hydrogen atoms and $R^7$ is selected from a fluorine atom and a methoxy group;
(iii) $R^7$, $R^8$, $R^{10}$, and $R^{11}$ are hydrogen atoms and $R^9$ is selected from methyl and nitro groups;
(iv) $R^7$, $R^{10}$ and $R^{11}$ are hydrogen atoms and $R^8$ and $R^9$ are methoxy groups;
(v) $R^7$ and $R^{11}$ are hydrogen atoms and $R^8$, $R^9$ and $R^{10}$ are methoxy groups;

$R^2$ and $R^3$ are each hydrogen atoms, or alternatively one is a hydrogen atom and the other a phenyl group, or further alternatively form with the adjacent nitrogen atom a heterocyclic ring such as a piperidine, piperazine or a pyrrolidine group; $R^4$ is selected from hydrogen and halogen atoms and a methyl group; $R^5$ is selected from hydrogen and halogen atoms and a nitro group; and $R^6$ is selected from hydrogen and halogen atoms.

The derivatives described above are of utility in the pharmacological field, since they have remarkable analgesic, anti-inflammatory and antipyretic properties; some of them have additional properties i.e. sedative, neuroleptic and even centrally stimulating properties.

Thus the present invention also provides a pharmaceutical preparation comprising as active ingredient at least one of the ortho-amino benzoyl hydrazine derivatives aforesaid in association with at least one pharmaceutically acceptable inert carrier.

The present invention also provides a process for preparing the ortho-amino benzoyl hydrazine effected in three stages.

Stage 1: In this stage, an ortho-amino benzoic acid derivative or N-substituted anthranilic derivative is prepared; among the latter, several are mentioned in the published literature. They may be prepared by a condensation process described by Ullmann which consists in effecting reaction of a primary aromatic amine with an ortho-halogenobenzoic aliphatic or heterocyclic acid in the presence of potassium carbonate and cupric acetate in a solvent such as dimethylformamide (D.M.F.) under reflux (Method A). These products not described in the literature are prepared by the following method (Method B):

Compounds for which $R^1$ is a

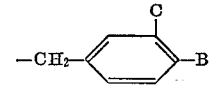

group may be prepared either by Method A or from an anthranilic acid and benzyl chloride (substituted or unsubstituted) in water in the presence of sodium carbonate at about 45° C. The reaction sequence is as follows:

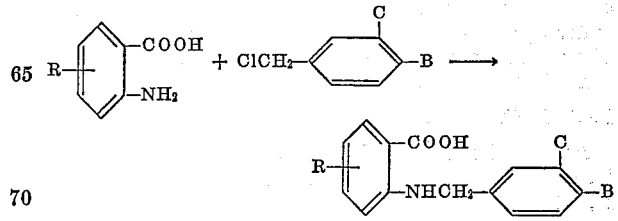

(See Table I hereafter.)

Stage 2: This consists in preparing an *isatoic anhydride derivative* by effecting reaction of phosgene with the corresponding acid. The process used is, in general, conventional. However, in accordance with this invention it is carried out in a very basic environment, which permits an improvement in the yield from this stage.

The anhydrides obtained are isolated and purified, either by washing in ether, efficiently removing any remaining traces of anthranilic acid, or by recrystallization from a suitable solvent such as ethanol or toluene. The reaction sequence is as follows:

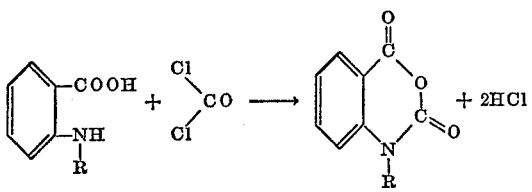

Stage 3: This stage consists in effecting reaction of hydrazine or substituted hydrazine with the isatoic anhydride derivative, during which carbonic anhydride carbon dioxide is released. It is useful to operate in conditions of cold. Nevetheless, it is advantageous to effect the reaction under reflux for a period within the range from 15 to 30 minutes in a solvent such as ethanol at about 95°. If an excess of the hydrazine is added, the yield is improved.

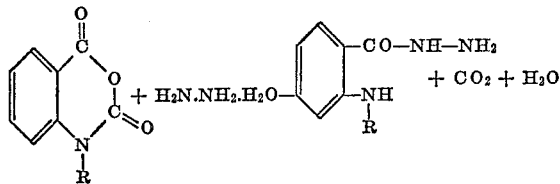

The invention will be better understood from the following Examples which are given by way of illustration and are not to be regarded as limitative.

EXAMPLE I

Method A

N-phenyl-ethyl-anthranilicacid: The following mixture was heated at reflux for 2 hours in D.M.F.:

52 g. of *ortho*-chloro-benzoic acid;
81 g. of β-phenyl-ethyl-amine;
46 g. of potassium carbonate;
5 g. of cupric acetate.

Then the reacting mixture was allowed to cool, the potassium salts were removed by filtration, and the filtrate was acidified with HCl to a pH of from 2 to 3. Grandually, a pale yellow precipitate was obtained, which was recrystallized from ethanol at 95°.

F=114° C.
Yield=75%

Acids prepared by this operating method appear in Table I.

EXAMPLE II

Method B 5-methyl N-benzyl anthranilic acid: To a solution in 500 ml. of water of 30.2 g. (0.2 mole) of 5-methyl anthranilic acid and of 10.6 g. (0.1 mole) of sodium carbonate at 45°, there were added, drop by drop, and under agitation, 25.3 g. of benzyl chloride in solution in 100 ml. of ethanol at 95°. After 2 hours, the precipitate formed was collected: 25.4 g. (yield; 52.5%).

F=158° C.

Analysis for $C_{15}H_{15}O_2N$.—Theory (percent): C, 74.7; H, 6.25; N, 5.81. Found (percent): C, 74.38; H, 6.28; N, 5.52.

Acids prepared according to this method appear in Table I.

EXAMPLE III

N-(butyl) amino-2-benzoyl hydrazine (a) N-butyl isatoic anhydride: To a solution in water of the sodium salt of N-butyl anthranilic acid, there were added 200 ml. of toluene. Into the stirred solution a current of phosgene was passed. Gradually, a clear-colored precipitate formed, which became soluble in the organic phase. When the aqueous phase became colorless, the organic layer was decanted, concentrated, and washed in an aqueous solution of sodium acetate.

A product was obtained which was very soluble in organic solvents. The product was recrystallized in petroleum ether.

F=52° C.
Yield; 84%=40 g.
(See analysis, Table II)

(b) N-butyl amino-2-benzoyl hydrazine: 40 g. of N-butyl-isatoic anhydride and 35 g. of hydrate of hydrazide were refluxed for 1 hour in 250 ml. of D.M.F. After hot filtration, crystallization was carried out in a refrigerator, and 17.9 g. of hydrazide was obtained.

F=73° C.
Yield; 47%.

(See elementary analysis, Table IV.)

EXAMPLE IV

Chloro-4'-phenyl-amino-2-benzoyl hydrazine (a) Chloro-4'-phenyl amino-2 benzoic acid: This acid was prepared according to Method A.

(b) Isatoic-N (chloro-4'-phenyl) anhydride: 40 g. of N-chloro-4' anthranilic acid were dissolved in a soda solution. There were added, drop by drop and under intense agitation, 120 ml. of a toluenic phosgene solution. After 4 hours, the precipitate formed (28 g.) was filtered. Yield: 63.5%.

(See elementary analysis, Table II.)

(c) N-(chloro-4'-phenyl) amino-2-benzoyl hydrazine: 28 g. of isatoic N-(chloro-4'-phenyl) isatoic anhydride were refluxed in 250 ml. of D.M.F. in the presence of 26 g. of hydrazine hydrate for 1 hour. On cooling the mixture 11 g. of a yellow-green product, whose fusion-point is 164° C., was obtained by crystallization.

By pouring the solution obtained after filtration into dilute hydrochloric acid, another 5 g. of product were obtained. The yield was 60%.

(See elementary analysis, Table IV.)

EXAMPLE V

N-benzyl amino-2-benzoyl hydrazine (a) Isatoic N-benzyl anhydride: 44 g. of N-benzyl anthranilic acid and 29.4 g. of sodium carbonate were dissolved in 1500 ml. of water. Under intense agitation at normal temperature, a solution of phosgene was added drop by drop to the toluene (200 ml. of a solution at 20%), and it was diluted with a further 200 ml. of toluene. Gradually, a white precipitate formed. When the addition was finished—after about 4 hours—agitation was continued for 2 further hours, then the precipitate obtained was filtered.

Thus 43.6 g. of product was obtained, or a yield of 88%.

F=140-142° C.

(See elementary analysis, Table II.)

(b) N-benzyl-amino-2-benzoyl hydrazine: 25 g. of isatoic N-benzyl anhydride were suspended in 300 ml. of ethanol at 95°. Then 22.6 g. of hydrazine hydrate were added, and the mixture was heated at reflux for 20 minutes. Filtering was effected hot, followed by crystallization. Thus 19.4 g. (Yield: 81.5%) of N-benzyl anthranilic hydrazide was obtained in the form of pole beige needles.

F=138° C.

(See elementary analysis, Table IV.)

EXAMPLE VI

4-chloro-N-benzyl-amino-2-benzoyl hydrazine (a) Isatoic-4-chloro-N-benzoyl anhydride: 32 g. 0.122 mole) of 4-chloro N-benzyl anthranilic acid and 19.6 g. (0.488 mole) of tablet soda were dissolved in 500 ml. of water.

Under intense agitation, there was added to this solution, drop by drop, a solution at 20% of phosgene in toluene. Agitation at ambient temperature was maintained overnight. The pale-pink precipitate obtained was blotted, washed in ether and dried.

Thus 27.8 g. (yield: 82%) of pink powder was obtained, whose fusion-point was 209° C.

(See elementary analysis, Table III.)

(b) 4-chloro-N-benzyl-amino-2-benzoyl hydrazine: A mixture made up of 0.1 mole (28.7 g.) of isatoic-4-chloro-N-benzyl anhydride and 0.5 mole of hydrazine hydrate in ethanol was refluxed at 95° for 30 minutes.

The solution was filtered hot. When cold, pale yellow needles formed which were recrystallized from ethanol at 95°.

Fusion point: F=160° C.

(See elementary analysis, Table V.)

EXAMPLE VII

N-phenyl-ethyl-amino-2-benzoyl hydrazine (a) Isatoic N-phenyl ethyl anhydride: 30 g. of N-phenyl ethyl anthranilic acid, prepared as described in Example I, were dissolved in 300 ml. of toluene at normal temperature. A current of gaseous phosgene was bubbled into the solution thus obtained. After 2 hours, an aqueous solution of sodium acetate was added, and the mixture was agitated for a further 30 minutes. The oil formed then crystallized. The precipitate obtained was filtered, dried, recrystallized in benzene, and provided 20 g. (60% yield) of a white product which melts at 175° C.

(b) N-phenyl-ethyl-amino-2-benzoyl hydrazine: A mixture of 15.7 g. of isatoic N-phenyl-ethyl anhydride (0.059 mole) and 14.7 g. of hydrate of hydrazine (0.059 x 5 mole) were refluxed in ethanol at 95°. After 30 minutes, the mixture was filtered hot and allowed to crystallize. With a yield of 90%, there was obtained N-phenyl-ethyl anthranilic hydrazide in the form of white needles, melting point 115° C.

EXAMPLE VIII

5-methyl N-benzyl amino-2 benzoyl hydrazine (a) Isatoic-5-methyl-N-benzyl anhydride: 24.1 g. (0.1 mole) of N-benzyl-5-methyl anthranilic acid, prepared as described in Example II, and 126 (0.3 mole) of tablet soda, were dissolved in 400 ml. of water.

To this solution, under agitation, there was added, drop by drop, a toluenic phosgene solution at 20% (90 ml.).

A white precipitate forms.

After 5 to 6 hours the precipitate was filtered, washed in ether and dried. 25 g. (yield: 93.5%) of white product was obtained.

F=159° C.

(See elementary analysis, Table III.)

(b) 5-methyl-N-benzyl-amino-2-benzoyl hydrazine: 20 g. of isatoic-5-methyl-N-benzyl anhydride and 11.2 g. of hydrazine hydrate were heated at reflux in ethanol at 95° for 15 minutes. The solution, filtered when hot, yielded white crystals (14 g.) when cooled.

F=130° C.
Yield: 73.5%

(See elementary analysis, Table V.)

EXAMPLE IX

4-chloro-N (dimethoxy-3',4'-phenyl ether) amino-2 benzoyl hydrazide

The acid:

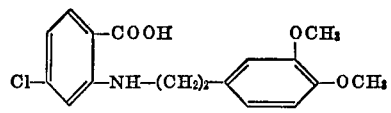

was prepared according to Method A.

(a) Isatoic-4-chloro-N-(dimethoxy-3',4'-phenyl ethyl) anhydride: 42.5 g. of acid (0.125 mole) and 20 g. (0.5) of soda were dissolved in 500 ml. of water. To this solution, which was intensely agitated, were added, drop by drop, 125 ml. (0.25 mole) of a toluenic solution of phosgene. A precipitate gradually appeared. Agitation was maintained overnight.

The precipitate, filtered, washed in ether and dried, amounted to 42.5 g. (yield: 94.5%) of a white product.

F=160° C.

(b) 4-chloro - N - (dimethoxy - 3',4' - phenyl ethyl) amino - 2 - benzoyl hydrazine: 18.1 g. (0.05 mole) of isatoic - 4 - chloro-N-dimethoxy - 3',4' - phenyl ethyl) anhydride and 10 g. (0.2 mole) of hydrazine hydrate were refluxed in 300 ml. of ethanol at 95°.

The reaction began cold and was completed by heating the preparation to reflux for 15 minutes.

Filtering was effected hot; when cold, the solution precipitated a very pale yellow poduct.

F=124° C.

(See Table V.)

N-(phenyl ethyl) amino-2-benzoyl amino piperidine 13.3 g. of isatoic N-phenyl ethyl anhydride and 15 g. of N-amino piperidine were heated to reflux for 3 hours in D.M.F. By pouring the mixture into dilute hydrochloric acid, 14.8 g. of a white product were obtained, melting point 153–154° C. Yield 92%.

Elementary analysis gives for $C_{20}H_{25}ON_3$.—Calculated (percent): C, 74.27; H, 7.79; N, 12.99. Found (percent): C, 74.37; H, 7.79; N, 12.57.

When $R_1$ is a benzoyl group, preparation needs three stages.

1. The first consists in condensing a ring-substituted anthranilic acid and an acid chloride (generally the chloride of a substituted benzoic acid).

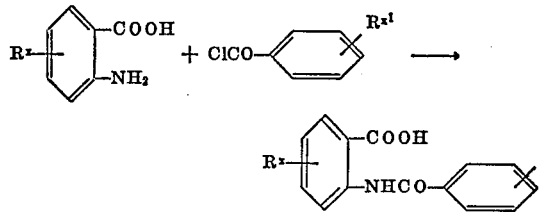

2. The product obtained was circulated hot in acetic anhydride.

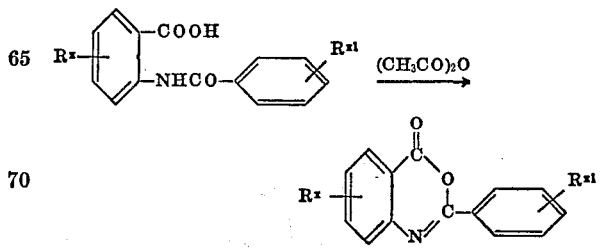

3. The benzoxazine 3,1-one-4 ring thus obtained was opened by reflux with hydrazine hydrate in ethanol at 95°.

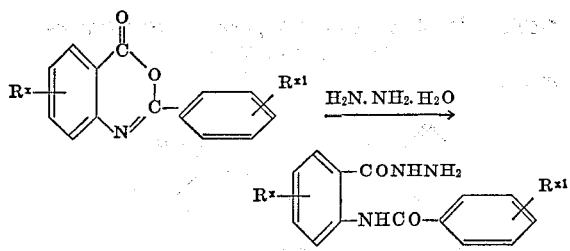

the terms $R^x$ and $R^{x1}$ are used to indicate respectively the substituents $R^4$, $R^5$ or $R^6$ for $R^x$, and $R^7$, $R^8$, $R^9$, $R^{10}$ or $R^{11}$ for $R^{x1}$.

EXAMPLE XI (a) 13.7 g. (0.11 mole) of anthranilic acid were dissolved in 200 ml. of anhydrous pyridine at room temperature, 15.8 g. (0.1 mole) of p-fluoro-benzoic acid chloride were added, drop by drop. Exothermic heating occurred and the mixture was agitated for 2 hours.

The mixture was concentrated to dryness, then dilute hydrochloric acid (100 ml. at 10%) was added to the residue. The precipitate obtained was filtered, washed and dried to constant weight.

(b) The product thus obtained was heated to reflux for 2 hours in acetic anhydride (200 ml.); after hot filtering, it crystallized when cold with a yield of 55 to 65% in relation to the original anthranilic acid.

F=170° C.

(c) 12 g. of benzoxazine and 5 g. of hydrate of hydrazine were heated to reflux in 150 ml. of ethanol at 95° for 1 hour. The mixture was filtered hot, then allowed to crystallize; thus 11 g. (yield: 81%) of N-p-fluorobenzoyl amino benzoyl hydrazine were obtained.

F=216° C.

(See elementary analysis, Table VI.)

EXAMPLE XII 15.1 g. (0.1 mole) of methyl-5-anthranilic acid were dissolved in 200 ml. of anhydrous pyridine with intense agitation at room temperature. 17.0 g. (0.1 mole) of o-methoxy benzoic acid chloride were added to the solution drop by drop.

Heating occurred immediately, the temperature rising to 70° C., then dropping gradually to room temperature while a precipitate of the chlorhydrate of pyridine appeared. The preparation was maintained under agitation for about 2 hours at room temperature, then it was concentrated to dryness, and 100 ml. of HCl at 10% was added.

The precipitate thus obtained was washed in water, then dried to constant weight.

The product obtained was dissolved in acetic anhydride and heated to reflux for 2 hours, then was filtered hot and allowed to crystallize. Thus 18.7 g. of product were obtained.

(Yield: 70% in relation to the original anthranilic acid.)

F=136° C.

15 g. of benzoxazine (0.056 mole) were heated to reflux for 2 hours in ethanol at 95° with 6 g. (0.12 mole) of hydrazine hydrate. After 2 hours of reflux and filtration, the preparation was allowed to cool, and 14.6 g. of the expected product were obtained (yield: 87%).

F=178° C.

TABLE I (structure: benzene ring with H, $R^4$, $R^5$, $R^6$ substituents, -COOH and -NHR$^1$ groups)

| $R^1$ | $R^4$ | $R^5$ | $R^6$ | Method of preparation |
|---|---|---|---|---|
| -(CH$_2$)$_2$-C$_6$H$_5$ | H | H | H | A |
|  | H | H | H | A |
| -(CH$_2$)$_2$-C$_6$H$_3$(OCH$_3$)$_2$ | H | H | H | A |
| -CH$_2$-C$_6$H$_5$ | H | H | H | A or B |
| -C$_6$H$_4$-CF$_3$ | H | H | H | A |
| -C$_6$H$_4$-OCH$_3$ | H | H | H | A |
| -C$_6$H$_4$-OCH$_3$ | H | H | H | A |
| -C$_6$H$_4$-OC$_2$H$_5$ | H | H | H | A |
| -C$_6$H$_4$-OC$_4$H$_9$ | H | H | H | A |
| -C$_6$H$_4$-Cl | H | H | H | A |
| -C$_6$H$_4$-F | H | H | H | A |
| -C$_6$H$_4$-F | H | H | H | A |
| -C$_4$H$_9$ | H | H | H | A |
| -CH$_2$-furyl | H | H | H | A |
| -C$_6$H$_4$-CH$_3$ | H | H | H | A |
| -C$_6$H$_3$(CH$_3$) | H | H | H | A |
| -C$_6$H$_3$(CH$_3$)$_2$ | H | H | H | A |
| -CH$_2$-C$_6$H$_5$ | H | NO$_2$ | H | B |
| -CH$_2$-C$_6$H$_5$ | H | Cl | H | B |
| -CH$_2$-C$_6$H$_5$ | CH$_3$ | H | H | B |
| -CH$_2$-C$_6$H$_5$ | Cl | H | Cl | B |
| -(CH$_2$)$_2$-C$_6$H$_5$ | H | Cl | H | A |
| -(CH$_2$)$_2$-C$_6$H$_3$(OCH$_3$)$_2$ | H | Cl | H | A |

TABLE II
N-substitute isatoic anhydrides

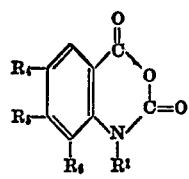

| R¹ | R⁴ | R⁵ | R⁶ | F (°C.) | C, percent Calcd. | C, percent Found | H, percent Calcd. | H, percent Found | N, percent Calcd. | N, percent Found | Recrystallization solvent |
|---|---|---|---|---|---|---|---|---|---|---|---|
| $-(CH_2)_2-C_6H_5$ | H | H | H | 175.2 | 72.0 | 72.07 | 4.90 | 4.97 | 5.25 | 5.09 | Benzene. |
| $-(CH_2)_2-C_6H_3(OCH_3)_2$ | H | H | H | 170 | 66.10 | 66.14 | 5.24 | 5.21 | 4.29 | 4.54 | Ethanol at 95°. |
| $-CH_2-C_6H_5$ | H | H | H | 140 | 71.2 | 71.17 | 4.37 | 4.45 | 5.52 | 5.35 | Do. |
| $-C_6H_4-CF_3$ | H | H | H | 171 | 58.6 | 58.59 | 2.62 | 2.59 | 4.55 | 4.58 | Do |
| $-C_6H_4-OCH_3$ (para) | H | H | H | 210 | 67.0 | 67.08 | 4.11 | 4.16 | 5.23 | 5.17 | Do. |
| $-C_6H_4-OCH_3$ (ortho) | H | H | H | 180 | 67.4 | 66.97 | 4.11 | 4.43 | 5.2 | 5.22 | Washing in ether. |
| $-C_6H_4-OC_2H_5$ | H | H | H | 153 | 68.0 | 68.30 | 4.62 | 4.70 | 4.95 | 5.07 | Do. |
| $-C_6H_4-OC_4H_9$ | H | H | H | 156 | 69.5 | 69.10 | 5.5 | 5.61 | 4.5 | 4.1 | Do. |
| $-C_6H_4-Cl$ | H | H | H | 167 | 61.5 | 61.69 | 2.95 | 2.97 | 5.45 | 5.44 | Do. |
| $-C_6H_4-F$ (para) | H | H | H | 204 | 65.5 | 65.35 | 3.14 | 2.97 | 5.45 | 5.44 | Ethyl acetate. |
| $-C_6H_4-F$ (ortho) | H | H | H | 188 | 65.5 | 65.36 | 3.14 | 3.14 | 5.45 | 5.28 | Ethanol at 95°. |
| $C_4H_9$ | H | H | H | 52 | 65.74 | 66.02 | 5.99 | 6.08 | 6.4 | 6.22 | Cyclohexane. |
| $-CH_2$-(tetrahydrofuryl) | H | H | H | 143 | 64.2 | 64.53 | 3.73 | 3.98 | 5.75 | 5.59 | Toluene. |
| $-C_6H_4-CH_3$ (para) | H | H | H | 156 | 71.25 | 70.92 | 4.35 | 4.24 | 5.52 | 5.40 | Ethanol at 95°. |
| $-C_6H_4-CH_3$ (ortho) | H | H | H | 180 | 71.25 | 71.50 | 4.35 | 4.37 | 5.52 | 5.50 | Do. |
| $-C_6H_3(CH_3)_2$ | H | H | H | 208 | 72.0 | 71.73 | 4.90 | 4.79 | 5.25 | 4.99 | Ethyl acetate. |

TABLE III
Substituted isatoic anhydrides

| $R^1$ | $R^4$ | $R^5$ | $R^6$ | F (° C.) | C, percent Calcd. | Found | H, percent Calcd. | Found | N, percent Calcd. | Found |
|---|---|---|---|---|---|---|---|---|---|---|
| —CH$_2$—C$_6$H$_5$ | CH$_3$ | H | H | 158 | 71.9 | 71.39 | 4.90 | 4.95 | 5.24 | 4.85 |
| —(CH$_2$)$_2$—C$_6$H$_5$ | H | Cl | H | 184 | 63.6 | 63.83 | 4.02 | 4.03 | 4.65 | 4.46 |
| —CH$_2$—C$_6$H$_5$ | H | Cl | H | 209 | 62.15 | 61.89 | 3.5 | 3.66 | 4.87 | 4.88 |
| —(CH$_2$)$_2$—C$_6$H$_3$(OCH$_3$)$_2$ | H | Cl | H | 160 | 58.5 | 58.6 | 4.63 | 4.90 | 3.78 | 3.69 |

TABLE IV
o-Amino benzoyl hydrazine substitutes ($R^4 = R^5 = R^6 = H$)

| No. | $R^1$ | Fusion point | Yield, percent | Recrystallization solvent | C, percent Calcd. | Found | H, percent Calcd. | Found | N, percent Calcd. | Found |
|---|---|---|---|---|---|---|---|---|---|---|
| 1 | —(CH$_2$)$_2$—C$_6$H$_5$ | 115 | 90 | Ethanol at 95° | 70.5 | 70.54 | 6.70 | 6.56 | 16.5 | 16.40 |
| 2 | —(CH$_2$)$_2$—C$_6$H$_3$(OCH$_3$)$_2$ | 104–105 | 92.5 | do | 64.80 | 64.53 | 6.71 | 6.73 | 13.33 | 13.03 |
| 3 | —C$_6$H$_4$—CF$_3$ | 135.7 | 88.3 | do | 57.0 | 56.66 | 4.10 | 4.13 | 14.25 | 14.67 |
| 4 | —CH$_2$—C$_6$H$_5$ | 138 | 81.5 | do | 69.70 | 69.36 | 6.26 | 6.44 | 17.43 | 17.77 |
| 5 | —C$_6$H$_4$—OC$_2$H$_5$ | 142 | 47 | Washing in ether | 66.5 | 66.66 | 6.31 | 6.35 | 15.5 | 15.23 |
| 6 | —C$_4$H$_9$ | 73 | 47 | do | 63.8 | 63.81 | 8.27 | 8.30 | 20.2 | 20.35 |
| 7 | —C$_6$H$_4$—CH$_3$ | 188 | 57.6 | do | 64.90 | 65.14 | 6.61 | 6.76 | 16.20 | 15.89 |
| 8 | —C$_6$H$_4$—Cl | 163 | 60 | Ethanol at 95° | 59.75 | 59.85 | 4.62 | 4.72 | 16.1 | 15.93 |
| 9 | —CH$_2$—(furyl) | 120 | 80 | do | 62.40 | 62.58 | 5.67 | 5.70 | 18.15 | 17.54 |
| 10 | —C$_6$H$_4$—CH$_3$ | 134 | 70 | do | 69.8 | 69.63 | 6.29 | 6.35 | 17.41 | 17.02 |
| 11 | —C$_6$H$_4$—OCH$_3$ | 124.5 | 80 | Washing in ether | 65.4 | 65.13 | 5.89 | 5.95 | 75.35 | 16.28 |
| 12 | —C$_6$H$_4$—OCH$_3$ | 134 | 78 | do | 65.36 | 65.38 | 5.88 | 5.85 | 16.33 | 16.29 |
| 14 | —C$_6$H$_3$(CH$_3$)$_2$ | 130 | 67 | do | 70.56 | 71.06 | 6.71 | 6.73 | 16.46 | 16.12 |
| 15 | —C$_6$H$_4$—OC$_4$H$_9$ | 121 | 80 | Ethanol at 95° | 68.21 | 68.13 | 7.07 | 7.27 | 14.04 | 14.16 |
| 16 | —C$_6$H$_4$—F | 137 | 82 | do | 63.66 | 63.95 | 4.89 | 4.91 | 17.15 | 17.07 |

TABLE V
o-Amino benzoyl hydrazone substitutes

| No. | R¹ | R⁴ | R⁵ | R⁶ | F, °C. | C, percent Calcd. | C, percent Found | H, percent Calcd. | H, percent Found | N, percent Calcd. | N, percent Found |
|---|---|---|---|---|---|---|---|---|---|---|---|
| 17 | —CH₂—C₆H₅ | CH₃ | H | H | 130 | 70.56 | 70.32 | 6.71 | 6.58 | 16.46 | 16.44 |
| 18 | —(CH₂)₂—C₆H₅ | H | Cl | H | 133 | 62.4 | 62.2 | 5.56 | 5.60 | 14.5 | 14.32 |
| 17 | —CH₂—C₆H₅ | H | Cl | H | 160 | 61.0 | 60.71 | 5.12 | 5.22 | 15.25 | 15.08 |
| 20 | —(CH₂)₂—C₆H₃(OCH₃)₂ | H | Cl | H | 124 | 58.4 | 58.3 | 5.72 | 5.66 | 12.0 | 11.90 |

TABLE VI

| No. | R¹ | R⁴ | R⁵ | R⁶ | F, °C. | Molecular weight | C, percent Calcd. | C, percent Found | H, percent Calcd. | H, percent Found | N, percent Calcd. | N, percent Found |
|---|---|---|---|---|---|---|---|---|---|---|---|---|
| 21 | —CO—C₆H₄—F (p) | H | H | H | 216 | 273.27 | 61.6 | 61.78 | 4.40 | 4.41 | 15.40 | 15.36 |
| 22 | —CO—C₆H₄—F (o) | H | H | H | 178 | 273.27 | 61.6 | 61.37 | 4.42 | 4.58 | 15.4 | 15.27 |
| 23 | —CO—C₆H₄—F (m) | H | H | H | 165 | 273.27 | 61.6 | 61.82 | 4.40 | 4.41 | 15.4 | 15.34 |
| 24 | —CO—C₆H₄—CF₃ | H | H | H | 168 | 323.26 | 55.70 | 55.6 | 3.74 | 3.69 | 13.0 | 13.01 |
| 25 | —CO—C₆H₄—F | CH₃ | H | H | 210 | 287.30 | 62.70 | 62.75 | 4.90 | 4.83 | 14.65 | 14.75 |
| 26 | —CO—C₆H₄—CF₃ | CH₃ | H | H | 190 | 337.31 | 57.0 | 57.34 | 4.19 | 4.16 | 12.45 | 12.23 |
| 27 | —CO—C₆H₄—CH₃ | CH₃ | H | H | 199 | 283.33 | 67.9 | 67.63 | 6.05 | 5.97 | 14.83 | 14.33 |
| 28 | —CO—C₆H₄—OCH₃ | CH₃ | H | H | 178 | 299.33 | 64.2 | 63.87 | 5.72 | 5.52 | 14.04 | 13.93 |
| 29 | —CO—C₆H₄—OCH₃ | H | H | H | 169 | 285 | 63.2 | 63.01 | 5.31 | 5.38 | 14.75 | 14.49 |
| 30 | —CO—C₆H₃(OCH₃)₂ | CH₃ | H | H | 199–200 | 329.36 | 62.00 | 61.90 | 5.81 | 6.00 | 12.76 | 12.40 |
| 31 | Same as above | H | Cl | H | 205 | 349.83 | 55.00 | 55.2 | 4.61 | 4.57 | 12.0 | 11.87 |
| 32 | —CO—C₆H₄—CH₃ | H | Cl | H | 231 | 303.8 | 59.31 | 59.16 | 4.64 | 4.56 | 13.83 | 13.57 |
| 33 | —CO—C₆H₄—NO₂ | Cl | H | Cl | 234 | 369.13 | 45.60 | 45.47 | 2.73 | 2.68 | 15.20 | 15.52 |
| 34 | —CO—C₆H₃(OCH₃)₂ | H | H | H | 195 | 315.30 | 61.0 | 61.24 | 5.44 | 5.42 | 13.34 | 13.00 |
| 35 | —CO—C₆H₄—OCH₃ | H | Cl | H | 180 | 319.80 | 56.35 | 56.40 | 4.42 | 4.41 | 13.15 | 12.96 |

TABLE VI—Continued

| No. | R¹ | R⁴ | R⁵ | R⁶ | F, °C. | Molecular weight | C, percent Calcd. | C, percent Found | H, percent Calcd. | H, percent Found | N, percent Calcd. | N, percent Found |
|---|---|---|---|---|---|---|---|---|---|---|---|---|
| 36 | —CO—⟨phenyl⟩(OCH₃)(OCH₃)(OCH₃) | H | H | H | 165 | 345.38 | 59.15 | 58.83 | 5.55 | 5.59 | 12.18 | 11.97 |
| 37 | —CO—⟨phenyl⟩—CH₃ | H | H | H | 236 | 269.26 | 67 | 66.63 | 5.62 | 5.65 | 15.61 | 15.41 |
| 38 | —CO—⟨phenyl⟩(OCH₃)(OCH₃)(OCH₃) | CH₃ | H | H | 186 | 359.25 | 60.25 | 60.13 | 5.89 | 6.12 | 11.71 | 11.56 |
| 39 | —CO—⟨phenyl⟩—CH₃ | Cl | H | Cl | 214 | 333.17 | 53.3 | 53.15 | 5.87 | 5.82 | 12.42 | 12.50 |
| 40 | —CO—⟨phenyl⟩—NO₂ | CH₃ | H | H | 210 | 314 | 57.20 | 57.18 | 4.48 | 4.48 | 17.80 | 17.82 |

EXAMPLE XIII

Visceral analysis action

Research into this effect was carried out according to Stegmund's test on phenylbenzoquinone ("Siegmund, Cadmus: Proc. Soc. Exp. Biol. Med. 1957, 95 729").

Intraperitoneal injection of phenylbenzoquinone provokes in mice crises whose frequency is reduced by the preventive administration of an analgesic.

The substances were administered orally thirty minutes before injection of the algogenic agent.

The animals were observed from the fifth to the tenth minute after injection with phenylbenzoquinone.

The percentage of animals protected was calculaed. A mouse was considered protected if it executed less than five convulsions in five minutes.

The results are given in Table VII.

It appears from these results that the analgesic activity was remarkable for several compounds.

Moreover, it should be noted that, for products Nos. 4, 24 and 33, at relatively low dosage, there is a visceral analgesic action of the same order as that of Pyramidon at a dosage of 80 mg./kg. per os, and that of Glaphemine at a dosage of 60 mg./kg. per os.

It should also be noted that, in Table VII, there is little notable toxicity of the derivatives together, particularly the most active products.

TABLE VII
Analgesic visceral activity

| Product number | Acute toxicity per os (mice), mg./kg., DL 50 | Dose mg./kg., percent activity/control |
|---|---|---|
| 1 | 750 | 75+100 / 50+40 / 25+20 |
| 3 | 400 | 50+30 |
| 4 | 1.200 | 50+90 |
| 5 | 1.200 | 90+60 |
| 7 | 600 | 80+30 |
| 8 | 500 | 30+50 |
| 10 | 250 | 25+60 |
| 14 | 300 | 30+50 |
| 15 | 1.200 | 300+60 |
| 21 | 1.200 | 80+60 |
| 22 | 1.200 | 90+70 |
| 23 | 600 | 60+50 |
| 24 | 1.200 | 120+90 |
| 25 | 1.200 | 300+70 |
| 27 | 1.200 | 120+30 |
| 28 | 1.200 | 300+20 |
| 29 | 1.200 | 300+50 |
| 33 | 1.200 | 150+90 |
| 35 | 1.200 | 300+60 |

Under the same experimental conditions, Pyramidon and Glaphemine give an activity of 100%.

EXAMPLE XIV

Central analgesic activity

The test of Amour and Smith was used, based on painful stimulation of thermal origin (Amour and Smith: "J. pharmacal 1941, 72, 74" and "1943, 77, 184").

The analgesic activity was investigated in the mouse, with reference to a painful stimulation of thermal original.

The mouse was restrained and the extremity of the tail irradiated with a luminous beam.

The withdrawal of the tail constitutes the pain and perception threshold.

The results obtained are shown in Table VIII.

TABLE VIII
Central analgesic activity

| Product number | Acute toxicity per os, mice | Dose, mg./kg. | Activity/controls |
|---|---|---|---|
| 4 | 1.200 | 50 | 20 |
| 8 | 500 | 50 | 20 |
| 33 | 1.200 | 300 | 45 |

Analgestic activity of central origin is far from comparable to the peripheral analgesic activity of Example XIII.

However, it is worth noting that for compound No. 33 there is an activity of 45% at a dosage of 300 mg./kg. per os.

EXAMPLE XV

Anti-inflammatory activity

This activity was investigated by the two conventional methods, causing oedemas in the rat, using either carraghenin or kaolin.

1. Carraghenion oedema: This was effected in the way described by Winter, C. A., Risley, E. A. and Nuss G. N., "Carraghenin-induced oedema in hind paw of the rat as an assay for anti-inflammatory drugs" Prod. Sor. Exp. Biol., N.Y. III, 544 (1962).

The rat was injected in the plantar area with 0.05 ml. of a solution of 1% carraghenin in physiological serum.

The volume of the paw was measured before, and three hours after the injection of the phlogogenic agent, with the help of the plethysmograph appelab.

All substances were administered orally.

The results are shown in Table IX.

It is evident that certain compounds have a clearly positive anti-inflammatory activity in this test.

Among the latter, products Nos. 3, 4, 33 produced inhibition of the oedema comparable to that obtained under the same experimental conditions with phenylbutazone 90 mg./kg. p.o.), niflumic acid (60 mg./kg. p.o.), and metiazinic acid (60 mg./kg. p.o.).

TABLE IX
Anti-inflammatory activity

| Product number: | Acute toxicity in mice, mg./kg., DL 50, approximation | Dose, mg./kg. | Percent inhibition, compared with controls |
|---|---|---|---|
| 1 | 750 | 80 | 35 |
| 3 | 400 | 40 | 50 |
| 4 | 1.200 | 180 | 55 |
| 5 | 1.200 | 180 | 35 |
| 7 | 600 | 45 | 15 |
| 9 | 250 | 40 | 20 |
| 11 | 200 | 25 | 10 |
| 23 | 600 | 60 | 20 |
| 24 | 1.200 | 120 | 20 |
| 27 | 1.200 | 180 | 10 |
| 29 | 1.200 | 180 | 20 |
| 33 | 1.200 | { 180 / 60 | 45 / 25 |
| 34 | 1.200 | 300 | 30 |

EXAMPLE XVI

Anti-inflammatory activity

2. Kaolin oedema: The procedure of Hillebrecht "J. Arzneim Forsch. 4, 607, 1954" was used.

0.1 ml. of a solution of 10% kaolin in distilled water was injected into the rat's plantar arch.

The volume of the paw was measured before, five hours and 24 hours after injection of the phlogogenic agent, with the help of the plethysmograph apelab.

All substances were administered orally both preventively and curatively; intubation was carried out 48 hours and 24 hours before the test. On the day of the test, the dose was injected in two intubations, two hours and 3 hours after injection of the kaolin. The following day an intubation was carried out one hour before measurement of the volume of the paw.

The percentage inflammation of the paw of the animal was calculated 5 hours and 24 hours after injection of the kaolin.

Results are shown in Table X.

TABLE X
Kaolin oedema

| Product number: | Acute toxicity in mice, mg./kg., DL 50, approximation | Dose, mg./kg., P.O. | Percent inhibition compared to controls |
|---|---|---|---|
| 1 | 750 | 90 | 10 |
| 3 | 400 | { 45 / 15 | 75 / 45 |
| 4 | 1.200 | 180 | 30 |
| 7 | 600 | { 45 / 180 | 15 / 40 |
| 33 | 1.200 | { 120 / 80 | 30 / 20 |

As in the previous test (carraghenin oedema), the results reveal a clear anti-inflammatory activity for numerous products.

The same derivates, Nos. 3, 4, 33, have an activity comparable to that of iniflumic acid, metiazinic acid and phenylbalazone.

EXAMPLE XVII

Antipyretic activity

Research consists in showing the reduction or inhibition of hyperthermy caused by brewer's yeast. The procedure described by Smith P. K. and Hambourger W. "J. Pharmacol Exp. Ther. 54, 346 (1935) was used.

Hyperthermy was caused experimentally in the rat by injection with brewer's yeast the day before the experiment.

All products were administered per os 16 hours after injection of the pyrogen.

An antipyretic product reduces the hyperthermia caused experimentally.

Results are shown in Table XI.

TABLE XI
Antipyretic activity

| Product number: | Acute toxicity in mice, mg./kg., DL 50, approximation | Dose, mg./kg., P.O. | Percent action/ medicament, Ref. Pyramidon, 125 mg./kg., P.O. |
|---|---|---|---|
| 1 | 750 | 80 | 60 |
| 2 | 900 | 60 | 50 |
| 7 | 600 | 60 | 50 |
| 33 | 1.200 | { 120 / 60 | 95 / 30 |

Only those products of interest here have been mentioned.

Derivate No. 33 merits particular mention.

For a slight DL 50, its antipyretic activity is in fact adjacent to that of the pyramidon used as a reference drug, at a dosage of 125 mg./kg. p.o.

EXAMPLE XVIII

Sedative activity

In order to investigate this activity, two tests were utilized.

The first was based on the study of the motor activity of mice.

The second used the potentiolization of barbiturate narcosis.

1. Study of motor activity: The procedure described by Dews P. B. "Brit. J. Pharmacol 8, 46–48, 1953" and by Boissier J. R. and Simon P. "Arch. int. Pharmacodyn 158, 212 (1965)."

Isolated mice were placed in cages through which were passed crossed luminous beams striking phoboelectric cells.

Actimeters allow totalization of the number of luminous beams crossed by the animal in 10 minutes.

The drug to be tested and the reference product (chlorpromazine), 5 mg./kg. were administered orally 30 minutes before the test.

The results are shown in Table XII.

There is a clearly sedative action with certain derivates. However, it must be noted that in order to achieve good results, the doses used were fairly high compared to the contral chlorpromazine.

TABLE XII
Study of motor activity of the mouse

| Product number: | Acute toxicity, oral, mice, mg./kg. | Dose, mg./kg., p.o. | Percentage of action, chlorpromazine, 5 mg./kg. |
|---|---|---|---|
| 2 | 900 | 50 | 65 |
| 3 | 400 | 50 | 95 |
| 22 | 1.200 | 100 | 40 |
| 23 | 600 | 60 | 35 |
| 24 | 1.200 | 200 | 60 |
| 25 | 1.200 | 200 | 40 |
| 27 | 1.200 | 200 | 45 |
| 28 | 1.200 | 200 | 60 |

EXAMPLE XIX

2. Potentialization of narcosis: The method used was that of Winter C. A. "J. Pharmacod. Exp. Ther. 94, 7–11, 1948."

The test attempted to find out if previous administration of the product to be tested, by gastric probe, extended the average duration of sleep induced by the injection of meburbital.

Results appear in Table XIII.

This test shows sedative activity for several derivates.

Although the doses used were strong, they still remain within the permitted limits.

TABLE XIII

Potentialization of Narcosis

| Product number: | Acute toxicity, oral, mice, mg./kg. | Hypnosedation | |
|---|---|---|---|
| | | Dose, mg./kg., p.o. | Percent of action disorpomazine |
| 2 | 900 | 50 | 100 |
| 3 | 400 | 50 | 80 |
| | | 30 | 30 |

EXAMPLE XX

In human therapy, pills are used which advantageously have the following composition:

For one tablet:

| | G. |
|---|---|
| Compound No. 4 | 0.100 |
| Diatomite | 0.100 |
| Sugar | 0.40 |
| Talc | 0.015 |
| Starch | 0.015 |
| Magnesium stearate | 0.005 |

Daily dosage is 3 to 4 tablets of the above composition.

EXAMPLE XXI

In human therapy, capsules are used which advantageously have the following composition:

For one capsule:

| | G. |
|---|---|
| Compound No. 33 | 0.250 |

Daily dosage is 2 to 4 capsules of the above composition.

EXAMPLE XXII

In rectal therapy, suppositories are used which advantageously have the following composition:

For one suppository:

| | G. |
|---|---|
| Compound No. 4 | 0.100 |
| Excipient q.s.p. | 3 |

One suppository of the above composition is administered in the evening on going to bed, and a second if necessary in the morning.

Naturally, the invention is in no way limited to the above examples, and is capable of numerous other variants available to the specialist, depending on the uses envisaged, and without, however, going beyond the scope of the invention.

What is claimed is:

1. An ortho-amino benzoyl hydrazine derivative of the general formula

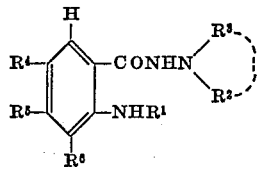

wherein $R^1$ is a substituted phenyl group

in which A is a chloro, fluoro, bromo, trifluoromethyl, butyl, methoxy, ethoxy or a butoxy group; a butyl group; an alkylaryl group having the formula

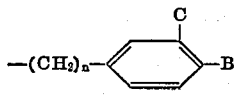

wherein $n$ is 1, 2 or 3 and B and C are hydrogen atoms or methoxy groups; a furfuryl group or a substituted benzoyl group

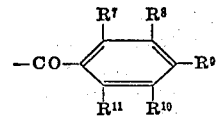

wherein $R^7$, $R^8$, $R^9$, $R^{10}$ and $R^{11}$ are selected as follows:
(i) $R^7$, $R^9$, $R^{10}$ and $R^{11}$ are hydrogen atoms and $R^8$ is a fluorine atom or a trifluoromethyl group;
(ii) $R^8$, $R^9$, $R^{10}$ and $R^{11}$ are hydrogen atoms and $R^7$ is a fluorine atom or a methoxy group,
(iii) $R^7$, $R^8$, $R^{10}$ and $R^{11}$ are hydrogen atoms and $R^9$ is a methyl or a nitro group,
(iv) $R^7$, $R^{10}$ and $R^{11}$ are hydrogen atoms and $R^8$ and $R^9$ are methoxy groups;

$R^2$ and $R^3$ are each hydrogen atoms, or alternatively one is a hydrogen atom and the other a phenyl group, or further alternatively $R^2$ and $R^3$ form with the adjacent nitrogen atom a piperidine ring; $R^4$ is hydrogen, a halogen atom or a methyl group; $R^5$ is hydrogen, a halogen atom or a nitro group, and $R^6$ is hydrogen or a halogen atom.

2. A hydrazine derivative according to claim 1 wherein $R^1$ is a phenyl group substituted with chlorine, fluorine, bromine, or a trifluoromethyl, butyl, methoxy, ethoxy, or a butoxy group.

3. A hydrazine derivative according to claim 1, wherein $R^1$ is a butyl group.

4. A hydrazine derivative according to claim 1 wherein $R^2$ and $R^3$ are such as to form with the adjacent nitrogen atom a piperidine group.

5. A hydrazine derivative according to claim 1, wherein a substituent selected from $R^4$, $R^5$ and $R^6$ is a chlorine atom.

6. A method of producing an ortho-amino benzoyl hydrazine compound having the formula

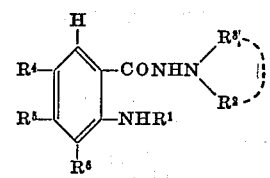

wherein
$R^1$ is

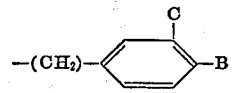

wherein B and C are hydrogen atoms or methoxy groups;
$R^2$ and $R^3$ are each hydrogen atoms, or alternatively one is a hydrogen atom and the other a phenyl group, or further alternatively $R^2$ and $R^3$ form with the adjacent nitrogen atom a piperidine ring;
$R^4$ is hydrogen, a halogen atom or a methyl group;
$R^5$ is hydrogen, a halogen atom or a nitro group, and
$R^6$ is hydrogen or halogen atom, said process comprising preparing an ortho-amino substituted benzoic acid by reacting an anthranilic acid having the formula

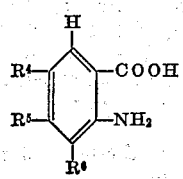

with a benzyl chloride having the formula

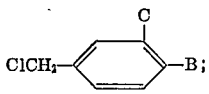

reacting said ortho-amino substituted benzoic acid with phosgene in a basic environment to form a substituted isatoic anhydride, having the formula

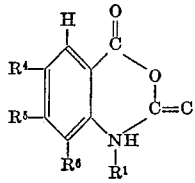

and
reacting said isatoic anhydride with a hydrazine compound having the formula

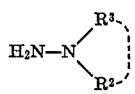

7. A method of producing an ortho-amino benzoyl hydrazine compound having the formula

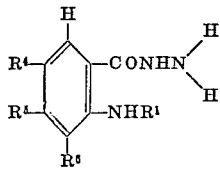

wherein $R^1$ is a substituted benzoyl group having the formula

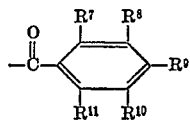

wherein $R^7$, $R^8$, $R^9$, $R^{10}$ and $R^{11}$ are selected as follows:

(i) $R^7$, $R^9$, $R^{10}$ and $R^{11}$ are hydrogen atoms and $R^8$ is a fluorine atom or a trifluoromethyl group;
(ii) $R^8$, $R^9$, $R^{10}$ and $R^{11}$ are hydrogen atoms and $R^7$ is a fluorine atom or a methoxy group;
(iii) $R^7$, $R^8$, $R^{10}$ and $R^{11}$ are hydrogen atoms and $R^9$ is a methyl or a nitro group;
(iv) $R^7$, $R^{10}$ and $R^{11}$ are hydrogen atoms and $R^8$ and $R^9$ are methoxy groups;

$R^4$ is hydrogen, a halogen atom or a methyl group, $R^5$ is hydrogen, a halogen atom or a nitro group, and $R^6$ is hydrogen or a halogen atom, said process comprising
condensing a benzoyl chloride having the formula $R^1$—X with an anthranilic acid having the formula

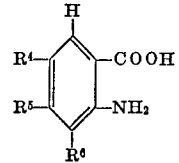

to obtain a condensation product;
circulating said condensation product in hot acetic anhydride to form a 3,1-one-4-benzoxazine having the formula

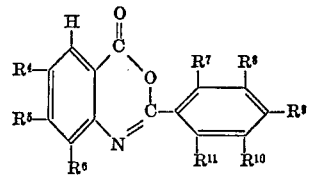

and
opening the ring of the 3, 1-one-4-benzoxazine by heating said benzoxazine to reflux in ethanol at about 95° C. in the presence of hydrazine hydrate.

References Cited
UNITED STATES PATENTS

| | | | |
|---|---|---|---|
| 1,903,880 | 4/1933 | Sander | 260—244 |
| 3,252,986 | 5/1966 | Gadekar | 260—295 |

JOHN D. RANDOLF, Primary Examiner

G. T. TODD, Assistant Examiner

U.S. Cl. X.R.

260—244 A, 268 N, 293.62, 326.42, 518 R, 518 A, 519, 347.3; 424—250, 267, 274, 324